Figure 1:
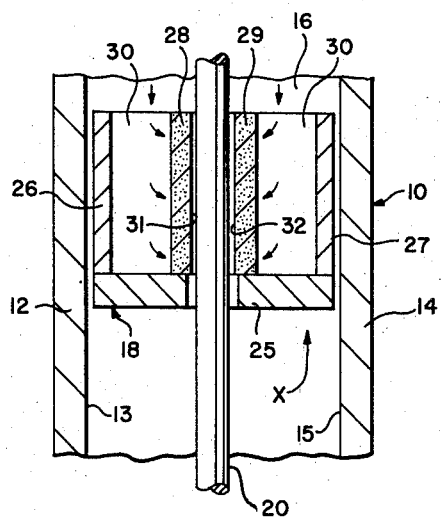

Dec. 18, 1962     E. F. MACKS     3,068,960

FLUID SUPPORTED DEVICE

Original Filed March 30, 1956

INVENTOR.
ELMER FRED MACKS

BY
ATTORNEYS 3,068,960
FLUID SUPPORTED DEVICE
Elmer Fred Macks, Vermilion, Ohio
Original application Mar. 30, 1956, Ser. No. 575,185, now Patent No. 3,001,609, dated Sept. 26, 1961. Divided and this application Sept. 26, 1961, Ser. No. 140,793
6 Claims. (Cl. 184—18)

This invention relates to mechanism having an element movable relative to another element in close surface-to-surface relationship, and more particularly to means for providing an effective lubricating film between the opposing surfaces of such elements to reduce friction and wear.

This application is a division of my co-pending application, Serial No. 575,185, filed March 30, 1956, under the same title, and now Patent No. 3,001,609.

In the mechanical arts, there are many instances where one element moves or slides relative to another element in close surface-to-surface relationship. Typical examples of these are the mechanisms of various types of engines, pumps, compressors and projectiles. Under such conditions, some method must generally be provided for lubricating the opposing surfaces of the elements in order to reduce friction and wear of the confronting parts.

In the past this has usually been accomplished by the use of some type of liquid lubricant. Many times these devices have proven unsatisfactory. Under some conditions, such as extremes of temperature, it is almost impossible to provide adequate lubrication with previously known arrangements.

The present invention provides novel lubricating means for a mechanism in which an element moves relative to another element in close surface-to-surface relationship. This novel lubricating means is especially suitable for elements which are relatively movable linearly.

More specifically, in the principal embodiments disclosed herein, the movable element is provided with fluid accumulating means, such as a chamber portion, in communication with a foraminous section defining a wall portion of the movable element, and means for supplying fluid under pressure to the fluid accumulating means whereby the fluid flows through the foraminous section to provide an effective lubricating film between the relatively moving parts.

The means for supplying fluid under pressure to the accumulating means may comprise any suitable arrangement such as pressurizing fluid in the accumulating chamber by the movement of the movable element in a volume of fluid medium defined by an associated member. Other examples of suitable means for supplying fluid under pressure are completely separate mechanical means such as a pump device and an inherently pressurizing chemical reaction such as an explosion. As used in this disclosure the term "foraminous accumulator" is used to designate a part of the mechanism; it will be understood that the member referred to is the movable element. The invention is particularly applicable for providing a film of gaseous fluid lubrication between relatively moving parts, although it may also be used in connection with other types of fluids.

In the co-pending application for patent Serial No. 433,946, filed June 2, 1954, entitled "Method and Apparatus for Providing Mobility," now abandoned in favor of continuation-in-part application for patent Serial No. 737,969, filed May 26, 1958, under the same title, the broad principles of a self-supporting and lubricating mechanism have been disclosed. The present invention contemplates the employment of the basic principles disclosed in that application in a moving accumulator which is carried by a guide.

The guide has a guide surface for directing the relative movement of the fluid accumulator. In its preferred form the moving accumulator has a foraminous wall with a surface that confronts the guide surface in closely spaced relationship.

In operation, fluid under pressure is introduced into a chamber in the accumulator member. The fluid then passes through the foraminous wall and forms a thin film of fluid under pressure between the surface of the foraminous wall and the guide surface.

This film consists of a moving fluid which is constantly escaping at either end of the area of confrontation. The film is constantly being replenished by a fresh supply of fluid which passes through the foraminous wall.

As fluid under pressure is passed through a restriction, a pressure drop is experienced. This pressure drop is proportional to the flow of fluid. The greater the flow the greater the pressure drop, and, conversely, the lower the fluid flow the lower the pressure drop.

The restriction orifices in the foraminous wall are so located as to provide an inherently self-centering and self-stabilizing effect. In some cases the foraminous wall surface may be covered with a multitude of such restriction orifices as in the case of sintered permeable materials, while in other cases the wall may contain only a few such restriction orifices carefully located so as to accomplish the intended objectives. The restriction orifices may be connected with shallow recesses or grooves in the foraminous wall support surfaces so as to effectively cover a larger area with one or more restriction orifices. Hence, as used in this application, the word "foraminous" is intended to include a permeable wall which will provide a load carrying film of fluid between the closely spaced surfaces through the mechanism of restricted flow through the wall.

Thus, when fluid is passed through the foraminous wall, a fluid film will be formed in the area of confrontation. Unless the forces exerted against the accumulator have a resultant which is axial, the accumulator will tend to move laterally toward a portion of the guide surface. This movement will reduce the space between the confronting surfaces and therefore the flow of fluid into and through this area will be decreased as well. As the flow decreases the pressure drop through the foraminous wall decreases and the mean film pressure increases. Conversely, on the opposite side of the moving accumulator, the mean pressure will be relatively low since the space in the area of confrontation, the fluid flow and the pressure drop have all been increased. It will thus be seen that the relative movement of the accumulator may be slightly eccentric with respect to the guide surface, but that the resultant of the pressure exerted by the fluid film is always a force tending to move the piston into a position where the axes of the accumulator and the guide are coincident.

Through this mechanism a supporting and lubricating fluid film is formed over the entire area of confrontation. Thus, the two members are able to move relatively without surface-to-surface contact.

It is, therefore, one of the principal objects of this invention to provide a mechanism in which a moving member may be wholly supported on a fluid film to substantially completely eliminate wear of the relatively moving parts.

In many applications such as a gas compressor, an internal combustion engine, or a valve, pressurized fluid is available in the operating mechanism. This fluid may be introduced under pressure into the foraminous accumulator to provide the lubricating means. The fluid need not be a lubricating oil but may be air, water, or other fluids which are not normally considered lubricants.

It is, then, an additional object of this invention to provide a mechanism wherein relatively moving parts may be lubricated without the addition of any special lubricating material. The cost of operation is thus materially reduced, the performance materially increased, and the likelihood of damage due to failure of the operator to lubricate the machine is completely eliminated.

Another object of this invention is to provide a mechanism having a member adapted for movement in close surface-to-surface relationship with respect to another member and novel means for providing an effective film of lubrication between the opposing surfaces of said members.

A further object of this invention is to provide a novel system utilizing gaseous fluid for lubricating elements of a mechanism that are relatively movable in close surface-to-surface relationship.

A more specific object of this invention is to provide a mechanism in which a member such as a foraminous accumulator is movable in close surface-to-surface relationship with respect to another member, such as a guide rod. The one member comprises a lubricant-containing portion and a foraminous surface defining said portion, and the other of the members comprises a guideway defining the path of travel of the one member. The mechanism also has means for exerting a pressure on the lubricant in said lubricant-containing portion of the first named member whereby the lubricant flows through said foraminous surface and provides a fluid film between the members to effectively reduce friction and eliminate wear occurring on the members when they are moved relatively.

Figure 2:
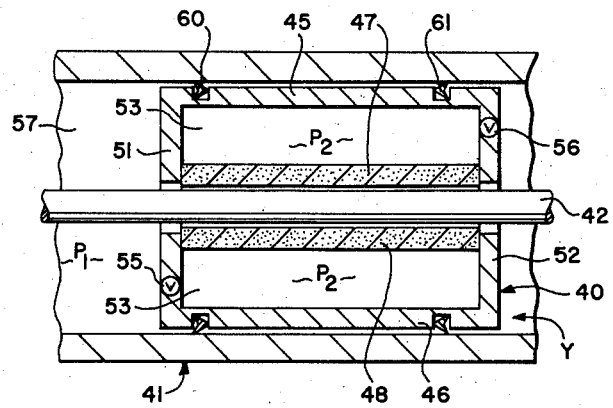

Other objects and a fuller understanding of the invention may be had by referring to the following description and claims, taken in conjunction with the accompanying drawings, in which:

FIGURE 1 is a diagrammatic sectional view of a casing and foraminous accumulator arrangement wherein the foraminous wall of the accumulator is disposed about and cooperates with an inner alignment guide; and, FIGURE 2 is a fragmentary sectional view disclosing a modification of the invention wherein the moving accumulator is employed as a double-acting piston with a check valve located in either end.

Referring now to FIGURE 1 of the drawings, there is shown a sleeve 10 which serves as a guide member and is in the form of a casing having enclosing walls 12 and 14. The walls 12, 14 define a fluid-containing cavity 16. The ends of the sleeve 10 may be opened or they may be closed over, depending on the particular type of application in which the mechanism is to be employed.

An accumulator member 18 is disposed in the sleeve 10 closely adjacent the inner surfaces 13, 15 of the walls 12, 14. The accumulator member is guided for relative movement in the sleeve 10 by a guide rod 20 that extends axially through the sleeve. It will be understood that any method of transmitting force to or from the accumulator member 18 may be used. Examples are fluid pressure, magnetic and electrical actuating arrangements, or a chemical reaction involving an explosive force. Such actuating means may exist at either end or both of the accumulator member. While in the embodiment shown the accumulator member is of piston-like configuration, the sleeve 10 and the accumulator member need not be of circular cross-sectional configuration.

The accumulator member 18 is defined by an annular end wall 25, radially outer side walls 26 and 27, and radially inner side walls 28 and 29. The radially inner and outer side walls, together with the end wall 25, define a chamber 30 which receives and accumulates fluid, as will hereinafter be more fully described. The radially inner side walls 28, 29 have exposed surfaces 31, 32, respectively, adjacent the rod 20. For purposes of illustration, there has been shown considerable distance between the walls 12, 14 of the sleeve and the opposing walls 26, 27 of the accumulator member and between the rod 20 and the walls 28, 29 of the accumulator. It will be understood, however, that in actual practice this spacing will be extremely small. For example, in the embodiment shown, the spacing between the wall surfaces 31, 32 and the rod will usually be of the order of 0.0001 to 0.010 inch per inch of cross section. It is to be understood that this spacing is dependent upon fluid, speed, load and other conditions of the particular application. In any event, the clearances between the surfaces 31, 32 and the rod 20 are less than the clearances between the radially outer side walls 26, 27 of the accumulator member and the walls 12, 14 of the sleeve 10.

The radially inner side walls 28, 29 of the accumulator member 18 are formed of a foraminous material, such as sintered metal or other material which is made permeable, as by drilling carefully located restriction orifices. The foraminous walls 28, 29 provide restricted communication between the chamber portion 30 and the space between the rod 20 and the opposing wall surfaces 31, 32 of the accumulator.

Fluid under pressure is accumulated in the chamber 30 by moving the accumulator member relative to the sleeve 10, as for example, in the direction of the arrow X. The pressurized fluid enters the chamber 30 through the open end of the accumulator member opposite the end 25. The accumulated and pressurized fluid flows through the foraminous wall sections 28, 29 to provide a continuous lubricating film of fluid between the guide rod 20 and the opposing wall surfaces 31, 32 of the accumulator. This film supports the accumulator 18 out of frictional surface-to-surface contact with the guide rod 20.

The rate of fluid flow through the foraminous walls 28, 29 will depend in part upon the difference in pressure between the fluid in the chamber portion 30 and the fluid in the space between the guide rod 20 and the surfaces 31, 32 of the walls 28, 29. Accordingly, an adequate supply of lubricating fluid is insured under all operating conditions.

As the accumulator 18 is moved relative to the sleeve 10, it may also drift laterally toward one wall 12 or 14. Should the accumulator 18 move laterally to the left as viewed in FIGURE 1, the space between the rod 20 and the surface 32 of the foraminous wall 29 will be reduced. This reduction in space results in an increase of the pressure of the fluid film in this space due to the decrease in the pressure drop through the foraminous wall 29 caused by a reduction in fluid flow through the wall. Conversely, the space between the surface 31 of the foraminous wall 28 and the guide rod 20 increases as the accumulator drifts laterally to the left, as viewed in FIGURE 1. This increase in the clearance between the rod and the surface 31 results in a decrease in the pressure of the fluid film due to an increase in pressure drop through the foraminous wall 28 caused by an increase in fluid flow through the foraminous wall. Thus, the foraminous accumulator and the associated guide rod constitute an inherent servo-mechanism which holds the relatively moving members out of contact irrespective of load components normal to the guiding surfaces. A somewhat similar action will occur should the accumulator member axially tilt on the guide rod 20.

Thus, the operation of the lubricating film-producing mechanism is inherently automatic, tending to maintain the accumulator 18 spaced from and floating on the guide rod 20. Accordingly, an effective fluid lubricating film is produced between the closely spaced, relatively moving parts of a mechanism to eliminate frictional contact and resultant wear.

It will be understood that this lubricating self-centering action occurs irrespective of whether the foraminous accumulator is adopted for relative linear or rotative movement in a vertical, horizontal or angular direction.

Reference is now made to FIGURE 2 which illustrates a modification of the invention. Reference numeral 40 designates an accumulator member that is generally similar to the corresponding member 18 of the embodiment illustrated in FIGURE 1. The accumulator member 40 is shown as being relatively movable horizontally in a sleeve or casing 41. A guide bar 42 axially extends through the sleeve 41 and guides the accumulator member 40 for relative movement.

The accumulator member 40 has radially outer side walls 45, 46 and radially inner, foraminous side walls 47, 48. The accumulator member is closed at its opposite ends 51, 52 to define the accumulator chamber portion 53.

Each end 51, 52 of the accumulator incorporates a one-way check valve 55 and 56, respectively. The valves 55 and 56 operate as intake valves for permitting fluid to enter the chamber portion 53 while preventing the fluid that has entered the chamber 53 from moving back through the valves into the fluid-containing cavity 57 of the sleeve 41.

When fluid is present in the cavity 57 under a pressure which exceeds the pressure of fluid in the chamber 53, a flow of fluid will occur through one or both of the check valves 55 and 56. For example, in the case of an air compressor where the accumulator member is moving in the direction of arrow Y, fluid may flow through the check valve 55 into the chamber 53. This occurs when the pressure $P_1$ of the fluid ahead of the accumulator member increases above the pressure $P_2$ of the fluid in the chamber 53. Thus, it will be seen that the pressure $P_2$ in the chamber 53 increases as the pressure $P_1$ in the cavity 57 is being increased as fluid in that area is compressed. Since intake valves are provided at both ends of the accumulator, fluid will be accumulated in the chamber 53 during all strokes of the accumulator member.

The trapped or accumulated pressurized fluid in the chamber 53 flows through the foraminous wall sections 47, 48 in the same manner discussed in connection with the embodiment of FIGURE 1 to provide a continuous lubricating film of fluid between the rod 42 and the opposed surfaces of the walls 47, 48. As discussed above, this lubricating film supports the accumulator 40 out of frictional surface-to-surface contact with the guide rod 42.

An endless seal 60 may be provided about the periphery of the accumulator 40 to provide a fluid seal between the accumulator and the inner surface of the sleeve 41. The endless seal may be of the well-known V-shaped configuration which expands in the presence of fluid pressure to prevent fluid leakage between the two members. A second endless seal 61 may be provided at the other end of the accumulator 40.

There has thus been described a mechanism comprising an element movable relative to another element in close surface-to-surface relationship, novel means for providing effective lubrication of the relatively moving parts, and wherein the movable element includes a foraminous portion in communication with means for supplying a pressurized fluid, which portion defines a bearing surface of a movable element whereby fluid is caused to flow through the foraminous portion to provide a lubricating film between the closely opposing bearing surfaces of the elements of the mechanism to minimize friction and to eliminate wear therebetween.

Although this invention has been described in its particular forms with a certain degree of particularity, it is to be understood that the present disclosure of the preferred forms has been made only by way of example and that numerous changes in the details of construction and the combination and arrangement of parts may be resorted to without departing from the spirit and the scope of the invention as hereinafter claimed.

What is claimed is:
1. A piston for use in a gas actuated mechanism comprising a substantially toroidal-shaped body for defining a gas accumulating chamber, said body including radially inner and outer side walls, said radially inner side walls including a gas compensating foraminous wall portion having an exposed guided surface and means for the pressure compensating passage of gas from said chamber through said guided surface in sufficient quantity to generate a load-carrying gas film to hold said piston out of contact with a guide adjacent said guided surface, and said body having passage means at one end for conducting gas into said chamber.

2. A mechanism comprising a sleeve for defining a fluid containing cavity, a guide member extending through said cavity, an accumulator member mounted for relative movement in said sleeve and guided by said guide member, said accumulator member having an internal pressure chamber for accumulating fluid, passage means in one end of said accumulator for connecting said cavity to said chamber, said accumulator member having a foraminous wall section surrounding said guide member, said foraminous wall section having an exposed guided surface closely adjacent to said guide member, and said foraminous wall section forming gas compensating means to permit a constant compensated flow of gas from said chamber through said wall to maintain said accumulator in spaced relationship with said guide member and with the greatest flow occurring where said guide member and said guided surface are spaced the greatest to maintain said guide member in guided surface out of contact when said mechanism is in operation.

3. A mechanism comprising a first member movable relative to a second member in closely spaced relationship, said second member being a guide bar for guiding the relative movement of said first member, said first member having a foraminous wall, said wall having an inner surface and an exposed guided surface, said guided surface being circumferentially disposed about said second member and closely spaced therefrom, gas accumulating means including a pressure chamber within said first member, said pressure chamber being defined in part by the inner surface of said foraminous wall, said first member including means for connecting said chamber to gas under pressure, and said foraminous wall forming gas compensating means to permit a constant compensated flow of gas from said chamber through said foraminous wall to maintain said first and second members in spaced relationship and with the greatest flow occurring where said second member and the guided surface of said first member are spaced the greatest to maintain said second member and guided surface out of contact when the mechanism is in operation.

4. The mechanism as claimed in claim 3 wherein said means for connecting said chamber to gas under pressure comprises an intake valve at an end of said first member.

5. A mechanism comprising a movable, substantially toroidal shaped member having an internal pressure chamber, a foraminous wall defining the radially inner wall of said member, said wall having an exposed bearing surface, the wall foramina of said foraminous wall providing means restricting communication between said chamber and said bearing surface, a sleeve around said movable member for defining a fluid-containing cavity, a guide bar mounted in said sleeve to axially extend through said movable member, said guide bar being closely spaced from said bearing surface to guide said member for relative movement through said sleeve, and means for supplying gas under pressure to said cavity and to said chamber so that gas is caused to pass through said restricting means to thereby create and maintain a total load-supporting film of gas under reduced pressure between the bearing surface of said member and said guide bar to maintain said bearing surface and guide bar in spaced relationship when said mechanism is in operation.

6. An assembly comprising a member movable relative to a guide and another member, said other member comprising a casing enclosing said movable member and said guide, said movable member having at least one foraminous wall section in closely opposing relationship to said guide, fluid accumulating means in communication with said foraminous wall section, and means for supplying fluid under pressure to said accumulating means whereby a lubricating film of fluid is produced between said wall section and said guide by the flow of fluid from said accumulating means through said foraminous wall section.

References Cited in the file of this patent

UNITED STATES PATENTS

| | | |
|---|---|---|
| 198,391 | Jamieson | Dec. 18, 1877 |
| 2,336,240 | Gavin | Dec. 7, 1943 |
| 2,409,057 | Meinke | Oct. 8, 1946 |
| 2,696,410 | Topanelian | Dec. 7, 1954 |